W. B. Emery,
Circular Sawing Machine.
No 12,197. Patented Jan. 9, 1855.
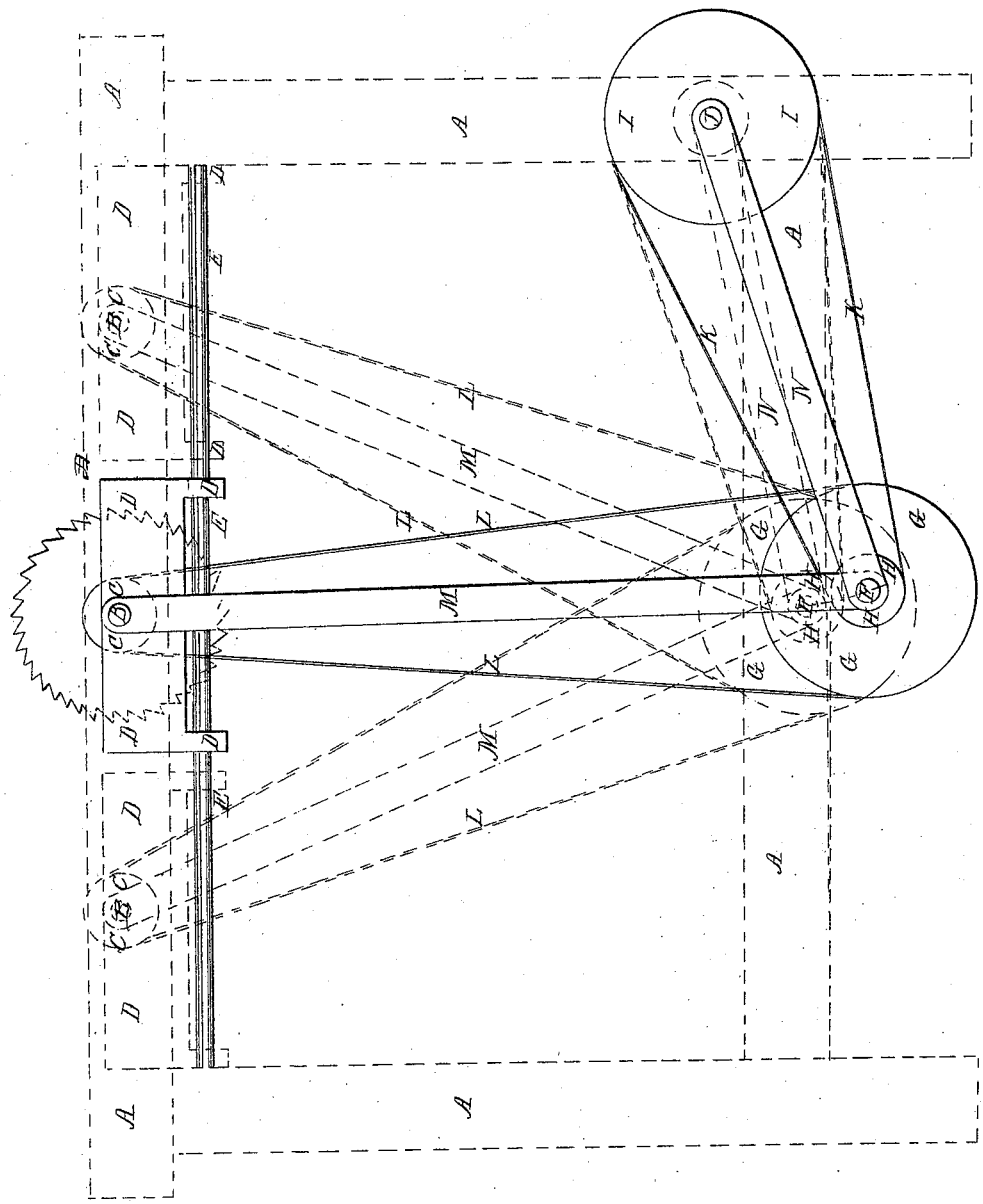

UNITED STATES PATENT OFFICE.

WILLIAM B. EMERY, OF ALBANY, NEW YORK.

MODE OF ARRANGING AND DRIVING CIRCULAR SAWS.

Specification of Letters Patent No. 12,197, dated January 9, 1855; Antedated November 13, 1854.

*To all whom it may concern:*

Be it known that I, WILLIAM B. EMERY, of the city and county of Albany, in the State of New York, have invented a new and useful improvement in the arrangement of the apparatus connected with circular saws for the greater ease and accuracy of crosscutting or otherwise sawing heavy planks or other things; and I do hereby declare that the following is a full, clear, and exact description of the construction and operation of the same, reference being had to the annexed drawings, making a part of this specification.

A is a section of the principal frame of the machine.

B is the saw mandrel with the pulley (C) upon it.

D is the sliding carriage carrying the saw mandrel.

E is one of the rods on which the carriage slides (these rods may be superseded by any other sliding apparatus).

F is the axis of the pulley which drives the saw mandrel.

G is the pulley that drives the mandrel.

H is the pulley that receives the belt from the main driver (I).

J is the axis of the main driving pulley and is fixed.

I is the main driving pulley.

K is the main belt.

L is the belt that drives the saw mandrel.

M is one of a pair of struts or radial arms designed to preserve the distance between the centers B and F.

N is a guide for the axis F (being substantially a segment of a circle of which J is the center) designed to sustain the strain of the belt K, and also to keep the axis F at its proper distance from the axis J while vibrating to accommodate the motions of the saw mandrel B.

P is a truck or wheel (concentric with the axis F and attached to the frame M) which rolls upon the face of the guide N. The dotted line O shows the path through which the axis F passes and is always equidistant from the axis or center J.

T is the path through which axis or mandrel B travels.

S is the saw or other cutter mounted upon the mandrel B.

The dotted lines show the saw mandrel in different positions, with the consequent different positions of the axis F, and the other parts.

The weight of F and its attachments may be counterbalanced if necessary, to relieve the saw carriage of the same.

I am aware that circular saws have been made to swing on the axes of their driving pulleys, causing the axis of the saw to move through the arc of a circle, having its center in the axis of said driving pulleys; therefore I do not claim that arrangement; neither do I claim the moving of the saw axis in a straight line, because this is done in various ways; but What I do claim and desire to secure by Letters Patent of the United States, is—

1. The manner herein described of arranging a saw mandrel and its attachments so as to carry the saw or other cutter through or along the stuff operated upon while such stuff remains at rest and the axis of the pulley driving the saw mandrel is caused to vibrate, or swing, so as to be always at an equal distance from it, and, also, from its own driving pulley for the purpose of preserving the proper tension of the belts.

2. Having thus described my invention I claim the combination of the three axes B, F and J, with the frame M and the guide N arranged substantially in the manner and for the purpose described.

WILLIAM B. EMERY.

Witnesses:
   H. S. McCALL,
   H. D. EMERY.